United States Patent [19]

Sakakima et al.

[11] Patent Number: 5,084,795
[45] Date of Patent: Jan. 28, 1992

[54] MAGNETIC HEAD AND METHOD OF MANUFACTURING THE SAME

[75] Inventors: Hiroshi Sakakima, Hirakata; Keita Ihara, Katano; Koichi Osano, Sakai, all of Japan

[73] Assignee: Matsushita Electric Industrial Co., Ltd., Osaka, Japan

[21] Appl. No.: 475,209

[22] Filed: Feb. 5, 1990

[30] Foreign Application Priority Data

Feb. 8, 1989 [JP] Japan .................................. 1-029103
Feb. 17, 1989 [JP] Japan .................................. 1-038602

[51] Int. Cl.$^5$ ............................................. G11B 5/235
[52] U.S. Cl. ...................................... 360/120; 148/306; 148/310; 148/311; 148/312; 148/313; 148/315; 148/317; 148/318; 420/128; 420/435; 420/436; 420/440; 420/441; 420/442; 420/452; 420/459
[58] Field of Search ................ 360/120, 126; 148/306, 148/310, 311, 312, 313, 315, 317, 318; 420/128, 435, 436, 440, 441, 452, 459, 442

[56] References Cited

U.S. PATENT DOCUMENTS 4,766,039  8/1988  Otomo et al. ..................... 360/126
4,836,865  6/1989  Sakakima et al. .................. 148/306

FOREIGN PATENT DOCUMENTS 10206774  12/1986  European Pat. Off. .
0288316   10/1988  European Pat. Off. ............ 148/306
20286124  10/1988  European Pat. Off. .
20300511  1/1989   European Pat. Off. .
53-119723 10/1978  Japan ................................. 148/306
60-128235 7/1985   Japan ................................. 148/312

Primary Examiner—John P. Sheehan
Attorney, Agent, or Firm—Stevens, Davis, Miller & Mosher

[57] ABSTRACT

A metal-in-gap type magnetic head having a small undulation of reproduction output caused by a pseudo-gap and method of manufacture thereof are provided, wherein the magnetic head employs as a back core a ferrite (particularly, a ferrite containing Sn) and employs in a metal portion which constitutes a front core an alloy film (particularly, a composition transition alloy film) having a composition expressed by T-M-X-N, where T is at least one metal element selected from a group consisting of Fe, Co and Ni, M is at least one metal element selected from a group consisting of Nb, Zr, Ti, Ta, Hf, Cr, Mo, W and Mn, X is at least one metalloid element selected from a group consisting of B, Si and Ge, and N is nitrogen.

7 Claims, 2 Drawing Sheets

MAGNETIC HEAD AND METHOD OF MANUFACTURING THE SAME

BACKGROUND OF THE INVENTION

1. Field of the Invention

The present invention relates to a magnetic head for use in a VTR or the like and a method of manufacturing the same.

2. Description of the Related Art

Figure 1:
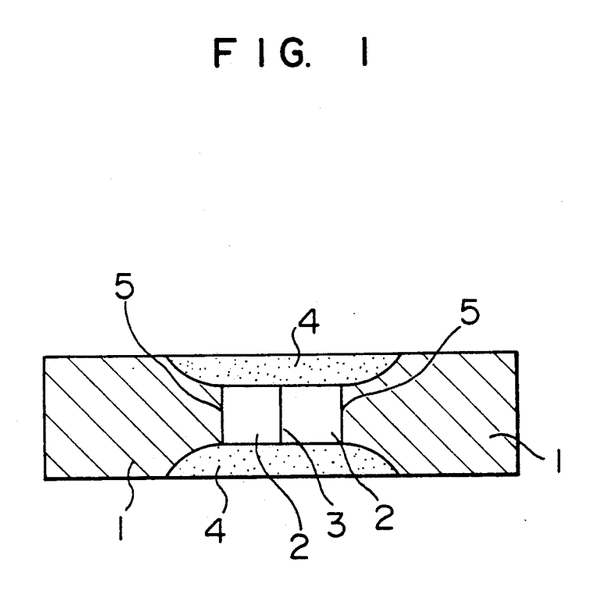
FIG. 1 is a schematic front view of an example of a MIG type magnetic head.

Metal-in-gap (MIG) heads which employ a F—Si—Al (Sendust) alloy or an amorphous alloy such as Co—Nb—Zr in the vicinity of a magnetic gap and which employ a Mn—Zn ferrite as a back core have been known. Such MIG type heads, in which a metal magnetic alloy film having a high saturation magnetic flux density (4'πMs) is disposed in the vicinity of the magnetic gap, have improved recording characteristics over magnetic heads which are made of a ferrite alone. FIG. 1 shows an example of such an MIG type head. In FIG. 1, a reference numeral 1 denotes a ferrite back core, 2 a metal magnetic alloy film, 3 a magnetic gap portion made of $SiO_2$ or the like, and 4 a bonding glass.

However, magnetic heads which employ F—Si—Al system alloys as the metal magnetic film suffer from a problem that Al is segregated in an interface 5 between the metal magnetic alloy film 2 and the ferrite core 1. Magnetic heads which employ amorphous Co—Nb—Zr system alloys as the head cores have a problem in that Nb or Zr deprives the ferrite of oxygen to generate an affected layer, which may lead to generation of a false gap and degradation of the characteristics of the magnetic head. Furthermore, it is very difficult to control the magnetic anisotropy of the F—Si—Al alloy film, and the characteristics of the F—Si—Al alloy film incorporated in the magnetic head easily varies. Control of the magnetic anisotropy of the Co—Nb—Zr amorphous alloy film is possible by means of heat treatment of the alloy film in that anisotropy of the Co—Nb—Zr alloy film disappears unless the amorphous alloy remains in the presence of a magnetic field throughout the heat treatment. A Co—Nb—Zr amorphous alloy film having a high saturation magnetization has a low crystallization temperature, and this makes the glass bonding process thereof in the vicinity of 500° C. very difficult. Further, the use of a normal ferrite in a magnetic head generates sliding noises, so the MIG head has a deteriorated C/N or S/N ratio as compared to a metal head.

BRIEF SUMMARY OF THE INVENTION

An object of the present invention is to provide a magnetic head which is capable of obviating the aforementioned problems.

To this end, the present invention provides a magnetic head which employs as a metal alloy film an alloy film having a composition expressed by the following composition formula to reduce the possibility of generation of an affected layer:

$$Ta\ Mb\ Xc\ Md \quad (1)$$

and which employs a ferrite, particularly, a single crystal ferrite containing Sn, as a back core so as to reduce sliding noises, and where T is at least one metal element selected from a group consisting of Fe, Co and Ni, M is at least one metal element selected from a group consisting of Nb, Zr, Ti, Ta, Hf, Cr, Mo, W and Mn, X is at least one metalloid element selected from a group consisting of B, C, Si and Ge, N is nitrogen, and a, b, c and d are atomic percents which fulfill the following conditions:

$$65 \leq a \leq 93 \quad (2)$$
$$4 \leq b \leq 20 \quad (3)$$
$$0 \leq c \leq 20 \quad (4)$$
$$2 \leq d \leq 20 \quad (5)$$
$$5 \leq b+c \quad (6)$$
$$a+b+c+d=100 \quad (7),$$
$$65 \leq a \leq 93 \quad (2')$$
$$4 \leq b \leq 20 \quad (3')$$
$$1 \leq c \leq 20 \quad (4')$$
$$2 \leq d \leq 20 \quad (5')$$
$$a+b+c+d=100 \quad (6')$$

The present invention further provides a method of manufacturing a magnetic head which utilizes the features of a MIG head manufacturing process. In this method, while a magnetic field is being applied in a direction substantially parallel to the surface of an alloy film which acts as a magnetic gap plane and substantially perpendicular to the depth of the magnetic gap in a state where the coefficient of diamagnetism is small, heat treatment is conducted at the Curie point of a ferrite substrate or above.

DETAILED DESCRIPTION OF THE INVENTION

A magnetic head according to the present invention employs as a magnetic alloy film a special nitriding alloy film expressed by composition formula (1). In this way, the reaction between the alloy film and a ferrite back core and, hence, the possibility of generation of an affected layer is reduced, and the problem involving a pseudo gap is thereby improved. Also, a single crystal ferrite containing Sn is used as a back core so as to reduce sliding noises. A magnetic head manufacturing method according to the present invention is effective to improve and unify the high-frequency characteristics of a magnetic head.

The alloy film having the composition expressed by composition formula (1) exhibits a soft-magnetic property when $$a \leq 94,\ 5 \leq b+c \quad (8)$$

In order to provide an alloy film having a high magnetization, it is preferable that $$65 \leq a,\ b \leq 20,\ c \leq 20 \quad (9)$$

Reaction with the ferrite is reduced and the possibility of generation of a false gap is reduced if $$\leq d \quad (10)$$

and, more preferably, $$3 \leq c+d \quad (10')$$

Separation of nitrogen from the film caused by the heat treatment can be prevented if $$4 \leq b \quad (11)$$

Internal stress of the alloy film is suppressed and separation of the film from the substrate is reduced when $$d \leq 20 \quad (12)$$

Expressions (8) to (12) thus explain expressions (2) to (7) or expressions (2') to (6').

In order to further improve a soft magnetic property of a nitride alloy film, a nitride alloy film whose composition is modulated in the direction of the thickness thereof, i.e., in the direction of lamination of the film, when it is manufactured is employed. The composition of such a nitride alloy film is as follows:

$$T_{a'} M_{b'} X_{c'} N_{d'} \quad (1')$$

where T, M, X and N are the same as those for formula (1), and a', b', c' and d' are atomic percents of an average composition of the elements which varies in the direction of the thickness of the film, and which fulfill the following conditions for the same reasons as those for expressions (2) to (7) and expressions (2') to (6'):

$$65 \leq a' \leq 93 \quad (2'')$$

$$4 \leq b' \leq 20 \quad (3'')$$

$$0 \leq c' \leq 20 \quad (4'')$$

$$2 \leq d' \leq 20 \quad (5'')$$

$$5 \leq b' + c' \quad (6'')$$

$$a' + b' + c' + d' = 100 \quad (7''), \text{ or}$$

$$65 \leq a' \leq 93 \quad (2''')$$

$$4 \leq b' \leq 20 \quad (3''')$$

$$1 \leq c' \leq 20 \quad (4''')$$

$$2 \leq d' \leq 20 \quad (5''')$$

$$a' + b' + c' + d' = 100 \quad (6''')$$

The thus-obtained compositionally modulated film (including a film having a laminated structure) exhibits excellent soft magnetic property. A film having a laminated structure is manufactured using the reactive sputtering in which nitriding layers and non-nitriding layers are laminated on top of the other by periodically introducing an inactive gas containing nitrogen gas. A compositionally modulated film or a film having a laminated structure is obtained by heat treating the thus-obtained film having a laminated structure. In conventionally used amorphous alloys, active Nb or Zr disposed in the interface may react with oxygen in the ferrite, generating an affected layer. However, in the nitride alloy films, Nb or Zr are selectively combined with nitrogen, and the possibility of generation of an affected layer is thus reduced. At the same time, since the element M in the composition formula (1) or (1'), such as Nb, Zr, Ti, Ta or Hf, combines with nitrogen firmly, nitrogen does not leave the film during the high-temperature heat treatment, and this stabilizes the quality and characteristics of the film. The element X in the composition formula (1) or (1') combines with nitrogen, unlike the element M which is combined with oxygen contained in the ferrite, and reaction between the ferrite and the magnetic alloy film is thus suppressed this leading to reduction of generation of a pseudo gap. Generation of a pseudo gap caused by the affected layer is further reduced by providing a Si—N, B—N or Al—N nitriding film having a thickness of 300 Å or less in each of the interfaces 5 between the ferrite core and the nitriding alloy film. If the thickness of the nitride film is higher than this, the nitride film may generate a pseudo gap. Furthermore, a C/N (or S/N) ratio of the magnetic head is improved by employing as a back core a single crystal ferrite containing Sn, which is capable of reducing sliding noises. A polycrystal ferrite whose grains have a small size may be used to reduce sliding noises. However, the use of the polycrystal ferrite generally reduces the output of the magnetic head and does not eliminate sliding noises completely. Therefore, a single crystal ferrite containing Sn is used.

Figure 2A:
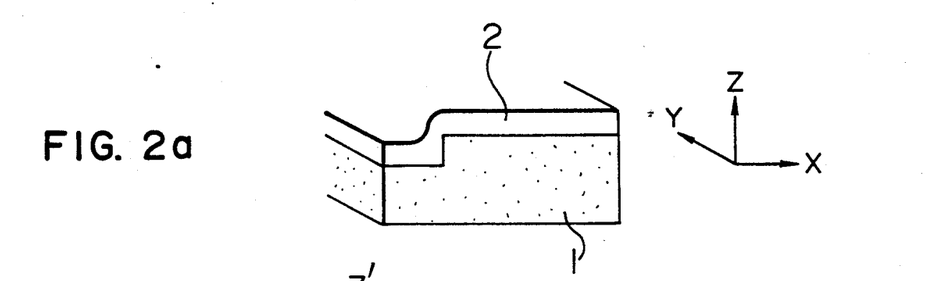
FIG. 2a-2c show examples of MIG type head manufacturing processes according to the present invention.
Figure 2B:
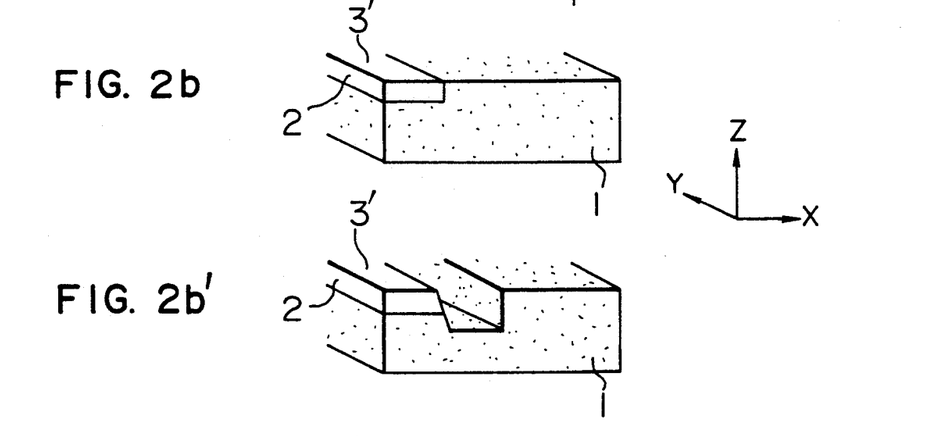
Figure 2C:
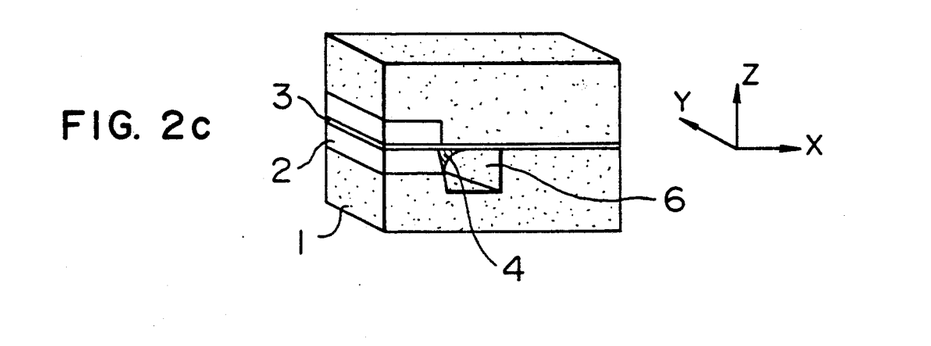

The aforementioned nitride alloy films are thermally stable, while conventional amorphous alloys, and heat treatment thereof at 500° C. or above is therefore possible. Furthermore, unlike the crystalline alloy such as F—Si—Al, magnetic anisotropy of the nitride alloy films can be easily controlled by means of the heat treatment thereof in the presence of a magnetic field. Once the nitride alloy films have been subjected to heat treatment in the presence of a magnetic field to make them magnetically anisotropic, the magnetic anisotropy of the nitride alloy films does not disappear easily when the alloy films are heat treated thereafter in the absence of a magnetic field at a temperature lower than that temperature. The present applicants took note of these features of the nitride alloy films and the fact that the MIG head manufacturing process is suitable for heat treating the nitriding alloy films in the presence of a magnetic field, and developed a method of manufacturing a magnetic head having excellent and uniform high-frequency characteristics. An example of the method of manufacturing a magnetic head according to the present invention will be described below with reference to FIG. 2.

In general, a magnetic head having a structure called metal-in-gap is manufactured by the manufacturing processes shown in FIG. 2a-2c. In FIG. 2, a reference numeral 1 denotes a single crystal ferrite containing Sn, 2a nitride magnetic alloy film, 3 a magnetic gap, and 4 a bonding glass. In the magnetic head shown in FIG. 2c, a magnetic path is preferably found such that it mainly passes in an X-Z plane around a winding hole 6, and an axis of easy magnetization thereof is directed in Y direction. However, to make the magnetic alloy film 2 in the state shown in FIG. 2c magnetically anisotropic in Y direction is very difficult, because the magnetic alloy film 2 has substantially the same order of dimensions in X, Y and Z directions and, hence, a very large coefficient of diamagnetism in Y direction, and requires application of a magnetic field having several thousands of oersted (Oe) to make it magnetically anisotropic in Y direction, which is practically very difficult. However, the axis of easy magnetization can be easily provided in Y direction if a magnetic field is applied to the nitride alloy film which has been deposited either on the ferrite substrate 1 using the sputtering technique or on a Si—N, B—N or Al—N nitride film formed on the ferrite substrate 1 to a thickness of 300 Å or less, as shown in FIG. 2a, or which has been polished in an X-Y plane so that the alloy film has a gap plane in that X-Y plane, as shown in FIG. 2b, in Y direction, i.e., in the direction parallel to a gap plane 3' and perpendicular to X direction of the depth of the gap, and at the same time if the nitride alloy film is subjected to heat treatment at the curie point of the ferrite substrate or above. At that time, the magnetic alloy film has a small coefficient of diamagnetization in Y direction, and requires a magnetic field having only several hundreds of oersted (Oe). In addition, the Curie point of the ferrite is 300° C. or less, and heat treatment at the Curie point of the ferrite or above does not affect diamagnetization of the ferrite substrate at all. The magnitude of the magnetic anisotropy in Y direction can be arbitrarily controlled by combining heat treatment in the presence of a fixed magnetic field in Y direction and heat treatment in the presence of a rotating magnetic field in the X-Y plane, i.e., in the gap plane. Next, after a winding groove such as that shown in FIG. 2b' has been formed in half of the bar shown in FIG. 2b and a gap material 3 such as SiO$_2$ has been then formed on the gap surface 3', the cores shown in FIGS. 2b and 2b' are bonded to each other by the glass 4 to provide a magnetic head shown in FIG. 2c. Since this glass bonding process is normally performed in the vicinity of 480° C., if the heat treatment in the presence of a magnetic field is performed at a temperature ranging from 500° C. to 650° C., the magnetic anisotropy provided in Y direction does not disappear during the glass bonding process which is conducted in the absence of a magnetic field. Conventionally employed amorphous alloy is thermally unstable at 500° C. or above, and this makes high-temperature heat treatment of the amorphous alloy in the presence of a magnetic field impossible.

The magnetic head manufactured in the manner described above exhibits excellent characteristics because the magnetic alloy films disposed in the vicinity of a gap possess ideal magnetic anisotropy. If the magnitude of this magnetic anisotropy is too large, the permeability of the alloy films reduces and reproduction efficiency of the magnetic head deteriorates, although the high-frequency characteristics may improve. Hence, the magnitude of the magnetic anisotropy must be optimized by adjusting the conditions of the heat treatment which is conducted in the presence of a magnetic field. The conditions include the time and the temperature for the heat treatment and combination of the heat treatment in the presence of a fixed magnetic field and the heat treatment in the presence of a rotating magnetic field.

EXAMPLE 1

A F—Si—Al alloy film (item A in Table 1) and a Co—Nb—Zr amorphous alloy film (item B in Table 1) were formed to a thickness of 8 μm on the Mn—Zn ferrite substrates using the sputtering technique to manufacture MIG type magnetic heads such as those shown in FIG. 1. Also, nitride alloy films respectively having a composition of Co70, Mn6, Nb7, B15, N2 (item C in Table 1) and Fe 76, Nb8, Si2, B12, N2 (item D in Table 1) were formed to a thickness of 10 μm on the Mn—Zn ferrite substrates using N$_2$ reactive sputtering technique in which Ar gas containing N$_2$ gas was introduced into the chamber and Co—Mn—Nb—B and F—Nb—Si—B alloy plates were used as the targets. Also, compositionally modulated films each of which includes Co—Mn—Nb—B non-nitride layers and Co—Mn—Nb—B—N nitride layers were formed to a thickness of 8 μm on the Mn—Zn ferrite substrates by sputtering the targets above mentioned in an Ar gas containing N$_2$ gas and Ar gas containing no N$_2$ gas alternately, and compositionally modulated films each of which includes Fe—Nb—Si—B non-nitride layers and Fe—Nb—Si—B—N nitride layers were formed to a thickness of 8 μm on the Mn—Zn ferrite substrates in a similar manner. Each of the layers has a thickness of about 100 Å. Compositionally modulated films having average compositions of <Co70, Mn6, Nb7, B15, N2> (item E in Table 1, <Co66, Mn6, Nb6, B14, N8> (item F in Table 1), and <Co63, Mn5, Nb5, B13, N14> (item G in Table 1); <Fe76, Nb8, Si2, B12, N2> (item H is Table 1), <Fe72, Nb7, Si2, B11, N8> (item I in Table 1) and <Fe68, Nb6, Si2, B10, N14> (item J in Table 1) were thus obtained by changing the partial pressure of the N$_2$ gas. Various types nitride alloy films formed on the Mn—Zn ferrite substrates in the manner described above were then subjected to the processes shown in FIG. 2 to manufacture MIG type magnetic heads. The heat treatment shown in FIG. 2a was conducted for 1 hour at 520° C. while 500 Oe of magnetic field was being externally applied in Y direction alone, while a magnetic field was being applied for 30 minutes in Y direction and was then being rotated in the X-Y plane for 30 minutes, and while no magnetic field was being applied, respectively. The glass bonding process shown in FIG. 2c was conducted in the absence of a magnetic field at 480° C. Various magnetic heads manufactured as described above were mounted on a normal VTR deck, and the characteristics thereof were compared using a metal tape. The magnetic heads all had a magnetic gap of 0.25 μm and a track width of 20 μm. Table 1 shows the results of the comparison.

As can be seen from Table 1, the magnetic heads according to the present invention exhibit low level of periodic variations in the reproduction output thereof caused by the pseudo gap. Furthermore, the use of the compositionally modulated film is advantageous than the use of the single nitride alloy film in terms of the reproduction output. Although the magnetic heads according to the present invention which were subjected to the heat treatment in the presence of a magnetic field exhibit excellent characteristics, those on which heat treatment was conducted in the presence of a fixed magnetic field exhibit excellent frequency characteristics of the reproduction output. Those on which heat treatment was conducted in the presence of both fixed and rotating magnetic fields exhibit a high reproduction output.

EXAMPLE 2

Compositionally modulated nitride alloy films each of which consists of nitride layers and non-nitride layers were formed on the Mn—Zn substrates using the reactive sputtering technique in which Ar gas containing N$_2$ gas and Ar gas containing as N$_2$ gas were introduced into the sputtering chamber and alloy plates of Co—Nb—Zr—B (item K in Table 2), Co—Nb—Hf—B (item L in Table 2), Co—Ti—Ta—B (item M in Table 2), Co—Mo—Cr—Zr—B (item N in Table 2), Co—Nb—B (item O in Table 2), F—Nb—Si (item P in Table 2), and F—Ni—W—Nb—Ge (item Q in Table 2) were used as the targets. The overall thickness of each of the alloy films was 8 μm, and the composition modulation wavelength and the contents of nitrogen were changed by controlling the mixture period and the partial pressure of $N_2$ gas. MIG type magnetic heads were manufactured using these nitride alloy films in the same manner as that of Example 1, and characteristics thereof were measured in the same manner as that of Example 1. However, the heat treatment was conducted at 600° C. for 30 minutes first in the presence of a fixed magnetic field and then for 15 minutes in the presence of a rotating magnetic field. Table 2 shows the results of the measurements. The relative reproduction output ratio in Table 2 is a comparison value of the reproduction output of a magnetic head with that of the F—Si—Al head shown in Table 1 being 0 dB.

As can be seen from Table 2, the magnetic heads incorporating the nitride alloy films exhibit low level of periodic variations in the reproduction output, which are caused by the pseudo gap. Furthermore, it is clear from Tables 1 and 2 that the more the contents of nitrogen in the alloy film, the greater the effect. Furthermore, it is also apparent that a long composition modulation wavelength (which is the thickness of one nitride layer+the thickness of one non-nitride layer) reduces the reproduction output of the magnetic head.

EXAMPLE 3

A F—Si—Al crystal alloy film (item A in Table 3) and a Co—Nb—Zr amorphous alloy film (item B in Table 3) were formed to a thickness of 8 μm on the single crystal Mn—Zn ferrite substrates containing Sn using the sputtering technique to manufacture MIG type magnetic heads such as those shown in FIG. 1. Also, nitride alloy films respectively having a composition of Co83, Nb10, Zr5, N2 (item C in Table 3) and Fe78, Nb8, B12, N2 (item D in Table 3) were formed to a thickness of 8 μm on the single crystal Mn—Zn ferrite substrates containing Sn using the reactive sputtering technique in which Ar gas containing $N_2$ gas was introduced onto Co—Nb—Zr and F—Nb—B alloy plates, respectively. Also, compositionally modulated films each of which includes Co—Nb—Zr non-nitride layers and Co—Nb—Zr—N nitride layers were formed to a thickness of 8 μm on the single crystal Mn—Zn ferrite substrates containing Sn by periodically introducing Ar gas containing $N_2$ gas and Ar gas containing no $N_2$ gas into the sputtering chamber and the alloy plates were used as the targets, and compositionally modulated film each of which includes F—Nb—B non-nitride layers and F—Nb—B—N nitride layers were formed to a thickness of 8 μm on the single crystal Mn—Zn ferrite substrates containing Sn in a similar manner. Each of the layers had a thickness of about 100 Å. Composition transition films having average compositions of <Co83, Nb10, Zr5, N2 > (item E in Table 3), <Co78, Nb9, Zr5, N8> (item F in Table 3), and <Co74, Nb8, Zr4, N14> (item G in Table 3); <Fe78, Nb8, B12, $N_2$> (item H in Table 3), <Fe74, Nb7, B11, Nb8> (item I in Table 3) and <Fe70, Nb6, B10, N14> (item J in Table 3) were thus obtained by changing the partial pressure of the $N_2$ gas. Various types nitride alloy films formed on the Mn—Zn ferrite substrates containing Sn in the manner described above were then subjected to the processes shown in FIG. 2 to manufacture MIG type magnetic heads. That heat treatment shown in FIG. 2a was conducted for 1 hour at 560° C. while 500 Oe of magnetic field was being externally applied in Y direction alone, while a magnetic field was being applied for 30 minutes in Y direction and was then being rotated in the X-Y plane for 30 minutes, and while no magnetic field was being applied, respectively. The glass bonding process shown in FIG. 2c was conducted in the absence of a magnetic field at 480° C. Various magnetic heads manufactured in the above-described manners were mounted on a normal VTR deck, and the characteristics thereof were compared using a metal tape. The magnetic heads all had a magnetic gap of 0.25 μm and a track width of 20μm. Table 3 shows the results of the comparison.

As can be seen from Table 3, the magnetic heads according to the present invention exhibit low level of periodic variations in the reproduction output thereof caused by the pseudo gap. Furthermore, the use of the composition transition film is advantageous than the use of the single nitride alloy film in terms of the reproduction output. Although the magnetic heads according to the present invention which were subjected to the heat treatment in the presence of a magnetic field exhibit excellent characteristics, those on which heat treatment was conducted in the presence of a fixed magnetic field exhibit excellent frequency characteristics of the reproduction output. Those on which heat treatment was conducted in the presence of both fixed and rotating magnetic fields exhibit a high reproduction output.

EXAMPLE 4

Compositionally modulated nitride alloy films each of which consists of nitride layers and non-nitride layers were formed on the single crystal Mn—Zn substrates containing Sn in a similar manner as that of Example 3 using the reactive sputtering technique in which Ar gas containing $N_2$ gas and Ar gas containing no $N_2$ gas were periodically introduced into the chamber and alloy plates of Co—Nb—Hf (item K in Table 4), Co—Ti—Ta—B (item L in Table 4), Co—Mo—Cr—Zr (item M in Table 4), F—Nb (item N in Table 4), F—Nb—Si (item 0 in Table 4) and F—Ni—W—Nb—Ge (item P in Table 4) were used as the targets. The overall thickness of each of the alloy films was 8 μm, and the composition transition wavelength (which is the thickness of a non-nitride layer+the thickness of a nitride layer) and the contents of nitrogen were changed by controlling the mixture period and the partial pressure of $N_2$ gas. MIG type magnetic heads were manufactured using these nitriding alloy films in the same manner as that of Example 3, and characteristics thereof were measured in the same manner as that of Example 3. However, the heat treatment was conducted at 600° C. for 30 minutes first in the presence of a fixed magnetic field and then for 15 minutes in the presence of a rotating magnetic field. Table 4 shows the results of the measurements. The relative reproduction output ratio in Table 4 is the comparison value of the reproduction output of a magnetic head with that of the F—Si—Al head shown in Table 1 being 0 dB.

As can be seen from Table 4, the magnetic heads incorporating the nitriding alloy film exhibit low level of periodic variations in the reproduction output, which are caused by the false gap. Furthermore, it is clear from Tables 3 and 4 that the more the contents of nitrogen in the alloy film, the greater the effect. Furthermore, it is also apparent that a long composition transition wavelength reduces the reproduction output of the magnetic head.

EXAMPLE 5

Compositionally modulated nitride alloy films each of which consists of nitride layers and non-nitride layers were formed on the single crystal ferrite substrates containing Sn and the single crystal ferrite substrates containing no Sn in a similar manner as that of Example 4 using the reactive sputtering technique in which Ar gas containing $N_2$ gas and Ar gas containing no $N_2$ gas were periodically introduced into the chamber and alloy plates of Co—Nb—Zr (item Q in Table 5), Co—Mn—Nb—B (item R in Table 5), F—Nb—C (item S in Table 5) and F—Nb—Si—B (item T in Table 5) were used as the targets. The overall thickness of each of the alloy films was 8 μm, and the composition modulation wavelength (which is the thickness of a non-nitride layer + the thickness of a nitride layer) was 200 Å. Also, after Si—N, B—N or Al—N having a thickness of 150 Å was formed on the single crystal Mn—Zn ferrite substrates containing Sn, the above-described compositionally modulated nitride alloy films were formed in the similar manner. MIG type magnetic heads were manufactured using these nitride alloy films in the same manner as that of Example 4, and characteristics thereof were measured in the same manner as that of Example 4. Table 5 shows the results of the measurements. The relative reproduction output ratio in Table 5 is the comparison value of the reproduction output of a magnetic head with that of the F—Si—Al head A shown in Table 3 being 0 dB As can be seen from Table 5, the level of sliding noises can be reduced and a C/N (or S/N) ratio of the magnetic head can be improved by employing a single crystal ferrite substrate containing Sn. Furthermore, periodic variations in the reproduction output caused by the pseudo gap can be eliminated by the provision of a Si—N, B—N or Al—N film between the ferrite and the nitriding alloy film.

As will be apparent from the above description, the MIG head according to the present invention exhibits a high C/N ratio and excellent frequency characteristics, and has a low level of periodic variations in the reproduction output caused by a pseudo gap.

TABLE 1

| | Metal core | Heat treatment in magnetic field | Relative reproduction output ratio at 4 MHz | Reproduction output ratio at 10 MHz/ 1 MHz | Periodic variations caused by a pseudo gap |
|---|---|---|---|---|---|
| A | Fe—Si—Al | No field | 0 dB | −10 dB | 7.0 dB |
| B | Co—Nb—Zr | No field | +1 dB | −8 dB | 8.0 dB |
| C | Co—Mn—Nb—B—$N_2$ | No field | −5 dB | −7 dB | 2.0 dB |
| | | Fixed | −1 dB | −5 dB | 2.5 dB |
| | | Fixed + rotating | 0 dB | −9 dB | 2.5 dB |
| D | Fe—NB—Si—B—$N_2$ | No fixed | −5 dB | −8 dB | 2.0 dB |
| | | Fixed | −2 dB | −6 dB | 2.5 dB |
| | | Fixed + rotating | −2 dB | −8 dB | 2.5 dB |
| E | <Co—Mn—Nb—B—$N_2$> | No field | −4 dB | −7 dB | 1.5 dB |
| | | Fixed | −1 dB | −5 dB | 2.0 dB |
| | | Fixed + rotating | 0 dB | −9 dB | 2.0 dB |
| F | <Co—Mn—Nb—B—$N_8$> | No field | −4 dB | −7 dB | 1.0 dB |
| | | Fixed | +1 dB | −6 dB | 1.0 dB |
| | | Fixed + rotating | +2 dB | −9 dB | 1.0 dB |
| G | <Co—Mn—Nb—B—$N_{14}$> | No field | −4 dB | −7 dB | 0.5 dB |
| | | Fixed | 0 dB | −5 dB | 0.5 dB |
| | | Fixed + rotating | +1 dB | −9 dB | 0.5 dB |
| H | <Fe—Nb—Si—B—$N_2$> | No field | −4 dB | −8 dB | 1.5 dB |
| | | Fixed | −1 dB | −6 dB | 2.0 dB |
| | | Fixed + rotating | −1 dB | −8 dB | 2.0 dB |
| I | <Fe—Nb—Si—B—$N_8$> | No field | −3 dB | −9 dB | 1.0 dB |
| | | Fixed | +1 dB | −6 dB | 1.0 dB |
| | | Fixed + rotating | +1 dB | −8 dB | 1.0 dB |
| J | <Fe—Nb—Si—B—$N_{14}$> | No field | −3 dB | −9 dB | 0.5 dB |
| | | Fixed | 0 dB | −6 dB | 0.5 dB |
| | | Fixed + rotating | 0 dB | −8 dB | 0.5 dB |

TABLE 2

| | Metal Core | Composition modulation wavelength (Å) | Relative reproduction output ratio at 4 MHz | Periodic variations caused by a pseudo gap |
|---|---|---|---|---|
| K | <$Co_{78}Nb_6Zr_4B_2N_{10}$> | 200 | +2 dB | 0.5 dB |
| | | 500 | +2 dB | 0.5 dB |
| L | <$Co_{78}Nb_{10}Hf_5B_1N_{14}$> | 200 | +1 dB | 0.5 dB |
| | | 500 | +1 dB | 0.5 dB |
| M | <$Co_{65}Ti_4Ta_4B_{20}N_7$> | 300 | 0 dB | 1.0 dB |

TABLE 2-continued

| Metal Core | | Composition modulation wavelength (Å) | Relative reproduction output ratio at 4 MHz | Periodic variations caused by a pseudo gap |
|---|---|---|---|---|
| | | 600 | −2 dB | 1.0 dB |
| N | $<Co_{73}Mo_7Cr_6Zr_7B_3N_4>$ | 300 | +1 dB | 2.0 dB |
| | | 600 | −1 dB | 2.0 dB |
| O | $<Co_{92}Nb_4B_1N_3>$ | 200 | −1 dB | 2.0 dB |
| | | 400 | −1 dB | 2.0 dB |
| P | $<Fe_{72}Nb_{12}Si_6N_{10}>$ | 200 | +1 dB | 0.5 dB |
| | | 600 | −1 dB | 0.5 dB |
| N | $<Fe_{72}Ni_{10}W_1Nb_{10}Ge_1N_6>$ | 300 | 0 dB | 1.5 dB |
| | | 500 | 0 dB | 1.5 dB |

TABLE 3

| | Metal core | Heat treatment in magnetic field | Relative reproduction output ratio at 4 MHz | Reproduction output ratio at 10 MHz/ 1 MHz | Periodic variations caused by a pseudo gap |
|---|---|---|---|---|---|
| A | Fe—Si—Al | No field | 0 dB | −10 dB | 7.0 dB |
| B | Co—Nb—Zr | No field | +1 dB | −8 dB | 8.0 dB |
| C | Co—Nb—Zr—$N_2$ | No field | −4 dB | −7 dB | 2.5 dB |
| | | Fixed | −1 dB | −5 dB | 2.5 dB |
| | | Fixed + rotating | 0 dB | −9 dB | 2.5 dB |
| D | Fe—Nb—B—$N_2$ | No fixed | −5 dB | −8 dB | 2.0 dB |
| | | Fixed | −2 dB | −6 dB | 2.5 dB |
| | | Fixed + rotating | −2 dB | −8 dB | 2.5 dB |
| E | $<Co—Nb—Zr—N_2>$ | No field | −4 dB | −7 dB | 2.0 dB |
| | | Fixed | −1 dB | −5 dB | 2.5 dB |
| | | Fixed + rotating | 0 dB | −9 dB | 2.5 dB |
| F | $<Co—Nb—Zr—N_8>$ | No field | −4 dB | −7 dB | 1.0 dB |
| | | Fixed | +1 dB | −6 dB | 1.0 dB |
| | | Fixed + rotating | +2 dB | −9 dB | 1.0 dB |
| G | $<Co—Nb—Zr—N_{14}>$ | No field | −4 dB | −7 dB | 0.5 dB |
| | | Fixed | +0 dB | −5 dB | 0.5 dB |
| | | Fixed + rotating | +1 dB | −9 dB | 0.5 dB |
| H | $<Fe—Nb—B—N_2>$ | No field | −4 dB | −8 dB | 1.5 dB |
| | | Fixed | −1 dB | −6 dB | 2.0 dB |
| | | Fixed + rotating | −1 dB | −8 dB | 2.0 dB |
| I | $<Fe—Nb—B—N_8>$ | No field | −3 dB | −9 dB | 1.0 dB |
| | | Fixed | +1 dB | −6 dB | 1.0 dB |
| | | Fixed + rotating | +1 dB | −8 dB | 1.0 dB |
| J | $<Fe—Nb—B—N_{14}>$ | No field | −3 dB | −9 dB | 0.5 dB |
| | | Fixed | 0 dB | −6 dB | 0.5 dB |
| | | Fixed + rotating | 0 dB | −8 dB | 0.5 dB |

TABLE 4

| Metal Core | | Composition modulation wavelength (Å) | Relative reproduction output ratio at 4 MHz | Periodic variations caused by a pseudo gap |
|---|---|---|---|---|
| K | $<Co_{71}Nb_{10}Hf_5N_{14}>$ | 200 | +1 dB | 1.0 dB |
| | | 500 | +1 dB | 1.0 dB |
| L | $<Co_{65}Ti_4Ta_4B_{28}N_7>$ | 300 | 0 dB | 1.0 dB |
| | | 600 | −2 dB | 1.0 dB |
| M | $<Co_{76}Mo_5Cr_5Zr_{10}N_4>$ | 300 | +1 dB | 2.0 dB |
| | | 600 | −1 dB | 2.0 dB |
| N | $<Fe_{92}Nb_4N_4>$ | 200 | −1 dB | 2.0 dB |
| | | 400 | −1 dB | 2.0 dB |
| O | $<Fe_{72}Nb_{12}Si_6N_{10}>$ | 200 | +1 dB | 0.5 dB |
| | | 600 | −1 dB | 0.5 dB |
| P | $<Fe_{72}Ni_{10}W_1Nb_{10}Ge_1N_6>$ | 300 | 0 dB | 1.5 dB |
| | | 500 | 0 dB | 1.5 db |

TABLE 5

| Metal core interface material/ ferrite core | Relative on reproduction output ratio at 4 MHz | Periodic variations caused by a pseudo gap | Sliding noises |
|---|---|---|---|
| Q $\leq Co_{78}Nb_8Zr_4N_{10}>$ | | | |
| Mn—Zn | +2 dB | 0.5 dB | 3 dB |
| Mn—Zn containing Sn | +2 dB | 0.5 dB | 0 dB |
| Si—N/Mn—Zn containing Sn | +1 dB | 0 dB | 0 dB |
| R $\leq Co_{74}Mn_4Nb_{10}B_2N_{10}>$ | | | |
| Mn—Zn | +1 dB | 0.5 dB | 3 dB |
| Mn—Zn containing Sn | +1 dB | 0.5 dB | 0 dB |
| B—N/Mn—Zn containing Sn | +1 dB | 0 dB | 0 dB |
| S $\leq Fe_{76}Nb_{10}C_4N_{10}>$ | | | |
| Mn—Zn | +1 dB | 1.0 dB | 3 dB |
| Mn—Zn containing Sn | +1 dB | 1.0 dB | 0 dB |
| Si—N/Mn—Zn containing Sn | +1 dB | 0 dB | 0 dB |
| T $\leq Fe_{66}Nb_8Si_4B_{12}N_{10}>$ | | | |
| Mn—Zn | +1 dB | 0.5 dB | 3 dB |
| Mn—Zn containing Sn | +1 dB | 0.5 dB | 0 dB |
| Al/N/Mn—Zn containing Sn | 0 dB | 0 dB | 0 dB |

What is claimed is:

1. A metal-in-gap magnetic head which employs as a back core a ferrite and which employs a magnetic alloy film having a composition expressed by the following composition formula in the vicinity of a magnetic gap:

$$T_a M_b X_c N_d$$

where T is at least one metal element selected from a group consisting of Fe, Co and Ni, M is at least one metal element selected from a group consisting of Nb, Zr, Ti, Ta, Hf, Cr, Mo, W and Mn, X is at least one metalloid element selected from a group consisting of B, Si and Ge, N is nitrogen, and a, b, c and d are atomic percents which fulfill the following conditions:

$65 \leq a \leq 93$ $4 \leq b \leq 20$ $0 \leq c \leq 20$ $2 \leq d \leq 20$ $5 \leq b+c$ $a+b+c+d=100$ and wherein undulation of reproduction output caused by a pseudogap is 2.5 dB or less and wherein, said head further comprises a nitride layer interposed between said back core and said magnetic alloy film.

2. A metal-in-gap magnetic head which employs as a back core a ferrite and which employs a magnetic alloy film having a composition expressed by the following composition formula in the vicinity of a magnetic gap:

$$T_a M_b X_c N_d$$

where T is at least one metal element selected from a group consisting of Fe, Co and Ni, M is at least one metal element selected from a group consisting of Nb, Zr, Ti, Ta, Hf, Cr, Mo, W and Mn, X is at least one metalloid element selected from a group consisting of B, Si and Ge, N is nitrogen, and a, b, c and d are atomic percents which fulfill the following conditions:

$65 \leq a \leq 93$ $4 \leq b \leq 20$ $1 \leq c \leq 20$ $2 \leq d \leq 20$ $a+b+c+d=100$ and wherein undulation of reproduction output caused by a pseudogap is 2.5 dB or less and wherein said head further comprises a nitride layer interposed between said back core and said magnetic alloy film.

3. A magnetic head according to claim 2, wherein said magnetic alloy film disposed in the vicinity of said magnetic gap comprises laminated layers has a composition which is modulated in the direction of lamination of said layers and has an average composition expressed by the following composition formula:

$$T_{a'} M_{b'} X_{c'} N_{d'}$$

where T is at least one metal element selected from a group consisting of Fe, Co and Ni, M is at least one metal element selected from a group consisting of Nb, Zr, Ti, Ta, Hf, Cr, Mo, W and Mn, X is at least one metalloid element selected from a group consisting of B, Si and Ge, N is nitrogen, and a', b', c' and d' are atomic percents of an average composition which fulfill the following conditions:

$65 \leq a' \leq 93$ $4 \leq b' \leq 20$ $1 \leq c' \leq 20$ $2 \leq d' \leq 20$ $a'+b'+c'+d'=100$ 4. A metal-in-gap magnetic head which employs as a back core a ferrite which does not readily generate sliding noises and which employs a magnetic alloy film having a composition expressed by the following composition formula in the vicinity of a magnetic gap:

$$T_a M_b X_c N_d$$

where T is at least one metal element selected from a group consisting of Fe, Co and Ni, M is at least one metal element selected from a group consisting of Nb, Zr, Ta, Hf, Cr, Mo, W and Mn, X is at least one metalloid element selected from a group consisting of B, Si and Ge, N is nitrogen, and a, b, c and d are atomic percents which fulfill the following conditions:

$65 \leq a \leq 93$ $4 \leq b \leq 20$ $0 \leq c \leq 20$ $2 \leq d \leq 20$ $5 \leq b+c$ $a+b+c+d=100$ and wherein undulation of reproduction output caused by a pseudogap is 2.5 dB or less and wherein, said head further comprises a nitride layer interposed between said back core and said magnetic alloy film.

5. A magnetic head according to claim 1 or 4, wherein said magnetic alloy film disposed in the vicinity of said magnetic gap comprises laminated layers has a composition which is modulated in the direction of lamination of said layers and has an average composition expressed by the following composition formula:

$$T_{a'} M_{b'} X_{c'} N_{d'}$$

where T is at least one metal element selected from a group consisting of Fe, Co and Ni, M is at least one metal element selected from a group consisting of Ng, Zr, Ti, Ta, Hf, Cr, Mo, W and Mn, X is at least one metalloid element selected from a group consisting of B, Si and Ge, N is nitrogen, and $a'$, $b'$, $c'$ and $d'$ are atomic percents of an average composition which fulfill the following conditions:

$$65 \leq a' \leq 93$$

$$4 \leq b' \leq 20$$

$$0 \leq c' \leq 20$$

$$2 \leq d' \leq 20$$

$$5 \leq b' + c'$$

$$a' + b' + c' + d' = 100$$

6. A magnetic head according to any one of claim 1, 2, 3 or 4, further comprising a Si, B or Al nitride film having a thickness of 300 Å or less, said nitride film being disposed in an interface between said magnetic alloy film and said ferrite core.

7. A metal-in-gap magnetic head according to claim 4 wherein said ferrite is a single crystal ferrite containing Sn.

* * * * *